April 24, 1956  F. K. H. NALLINGER  2,742,986
DEVICE FOR THE GEARSHIFT CONTROL OF CHANGE SPEED GEARS
Filed Nov. 15, 1949  3 Sheets-Sheet 1

INVENTOR
FRIEDRICH K. H. NALLINGER.
BY Dieke and Padlon
ATTORNEYS.

April 24, 1956  F. K. H. NALLINGER  2,742,986
DEVICE FOR THE GEARSHIFT CONTROL OF CHANGE SPEED GEARS
Filed Nov. 15, 1949  3 Sheets-Sheet 2
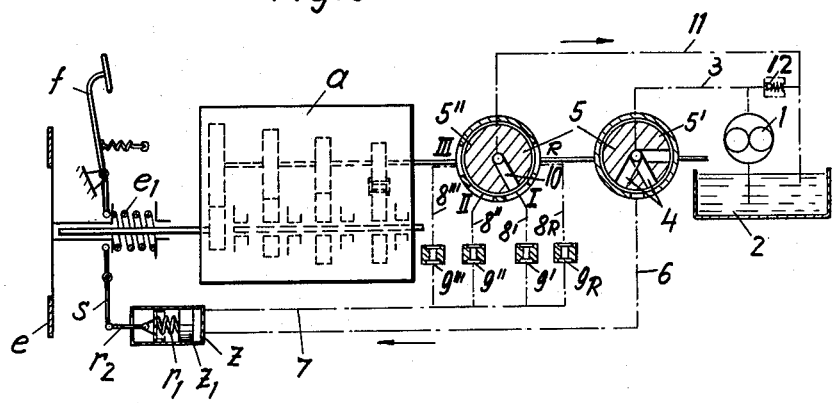
Fig. 3
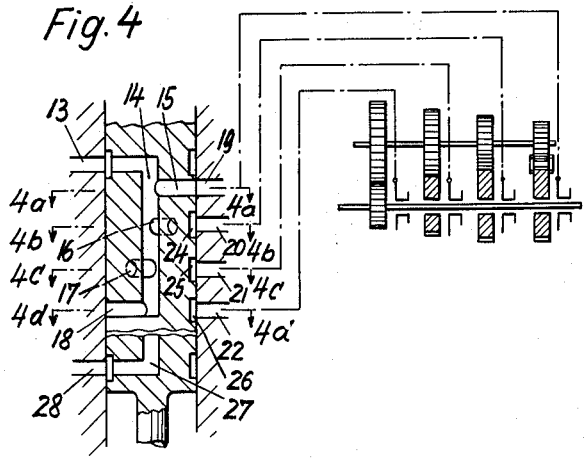
Fig. 4
Fig. 4a
Fig. 4b
Fig. 4c
Fig. 4d
INVENTOR
FRIEDRICH K. H. NALLINGER
BY Dicke and Padlon.
ATTORNEYS.

April 24, 1956     F. K. H. NALLINGER     2,742,986
DEVICE FOR THE GEARSHIFT CONTROL OF CHANGE SPEED GEARS
Filed Nov. 15, 1949     3 Sheets-Sheet 3

INVENTOR
FRIEDRICH K. H. NALLINGER
BY Dicke and Padlon
ATTORNEYS.

United States Patent Office 2,742,986
Patented Apr. 24, 1956

2,742,986
DEVICE FOR THE GEARSHIFT CONTROL OF CHANGE SPEED GEARS

Friedrich K. H. Nallinger, Stuttgart, Germany

Application November 15, 1949, Serial No. 127,300

Claims priority, application Germany November 19, 1948

26 Claims. (Cl. 192—.08)

In order to render possible the shifting of a variable drive ratio transmission or change-speed gear of motor vehicles under full load, or partial load or no-load without the operation of the main disconnecting clutch, the separate speeds have been provided with friction clutches, for example, plate clutches, multiple disk clutches or expanding band clutches, which were operated mechanically, hydraulically, pneumatically or electrically. A smooth shifting over of such clutches, however, is very difficult to accomplish since the contact pressure of the same would always have to change according to the change in transmitted torque. Such an adoption, however, would require expensive and complicated control devices for the separate speeds.

In contradistinction thereto, the present invention provides, in particular for motor vehicles, a simpler method of gearshift control for variable drive ratio transmission or change-speed gear including a main disconnecting clutch which disconnects either the change-speed gear from the driving part or from the driven part of the transmission, and the advantage of the present invention essentially consists in the fact that for the shifting of the gears the main disconnecting clutch is automatically more or less relieved from the clutch pressure normally operative to engage the clutch plates thereof. The transmission of torque is not completely interrupted thereby but is merely reduced. The disengagement in the simplest case may thereby take place uniformly during each shifting operation, or may depend upon the particular ratio of the transmission to be engaged, or on the torque, for instance, on the immediately prevailing torque in the main disconnecting clutch.

The advantage obtained in accordance with the present invention is based on the fact that by partially disengaging the main clutch during shifting only a fraction of the engine output is transmitted to the change-speed transmission so that the individual clutches provided for the different speeds or ratios may be made proportionately very small in size, i. e., they may operate with relatively high clutch or contact pressure, as, on the one hand, the individual clutches which are subjected, as is well known, to the greatest wear and tear during shifting, are taxed or loaded only with a fraction of the engine output due to the slippage occurring in the main clutch and, on the other, during the engagement of the particular ratio or speed, the rotating members of the transmission do not require acceleration from complete stand-still to the new rotational speed, but only need to be accelerated from the pre-existing to the new rotational speed.

The flexibility of the gearshift is not dependent any more on these separate clutches but solely on the main disconnecting clutch which is partially or entirely disengaged during the shifting. A slipping of this clutch obviates any jars in shifting.

Control of the main disconnecting clutch is suitably accomplished by an auxiliary force, for example, hydraulic, pneumatic, or electric. However, if occasion arises it may also be accomplished by purely mechanical means. As a rule the gearshift operations thus follow one another so that, to begin with, the main disconnecting clutch is disengaged and thereupon the hitherto engaged speed is thrown out and the main disconnecting clutch does not receive full clutch contact until after the new speed is thrown in.

Furthermore, in accordance with the present invention, the torque of the engine may be reduced simultaneously with the relieving of the main disconnecting clutch, in that, for example, the regulating member of the engine, for example, the accelerator, is suitably coupled with the actuating mechanism of the main disconnecting clutch. In that case positive clutches, for example, claw clutches may also be employed to advantage for the separate speeds. Particularly in this connection and in conformity with the present invention, the gear may also be provided with one or several coaster mechanisms by means of which the shifting is even further facilitated.

In accordance with the broader aspects of the present invention it is not absolutely necessary that a main disconnecting clutch, ordinarily arranged between engine and change speed gear, be employed as main clutch. A clutch, for example, located at the transmission end of the gear may also be employed in place of the main clutch or there may be an additional clutch.

In the drawing affixed to this specification and forming part thereof, several forms of gearshift arrangements for the application of the method of gearshift control, in which the invention is embodied, are illustrated diagrammatically by way of example, namely:

Fig. 3 is a gearshift diagram for a hydraulically shifted variable drive ratio transmission together with a main disconnecting clutch operated by hydraulic means in dependency on the operation of the gearshift member.

Figure 4 illustrates in detail the operation of the lever 5 of Figure 3 to actuate the various transmission ratios of the transmission $a$.

Figures 4a, 4b, 4c, and 4d are cross sections taken along lines 4a—4a, 4b—4b, 4c—4c, and 4d—4d of Figure 4.

Figure 1:
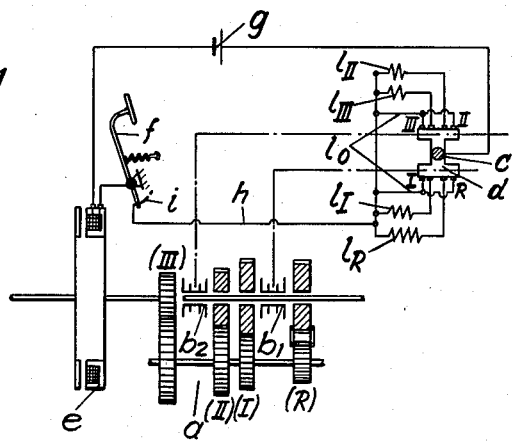
Fig. 1 is a gearshift diagram for a mechanically shifted variable drive ratio transmission together with an electro-magnetic main disconnecting clutch adapted to be disengaged when the transmission is shifted into a particular drive ratio or speed or is shifted out of a particular drive ratio or speed.
Figure 3A:
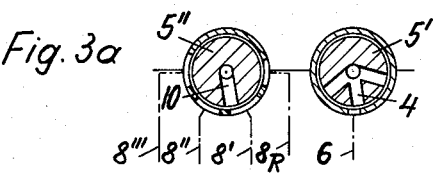
Figs. 3a to 3c show three different positions of the gearshift member according to Fig. 3.
Figure 3B:
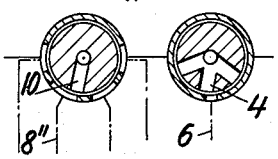
Figure 3C:
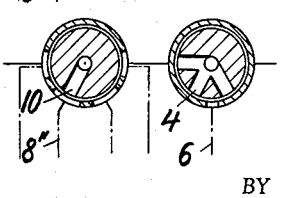
Figure 5:
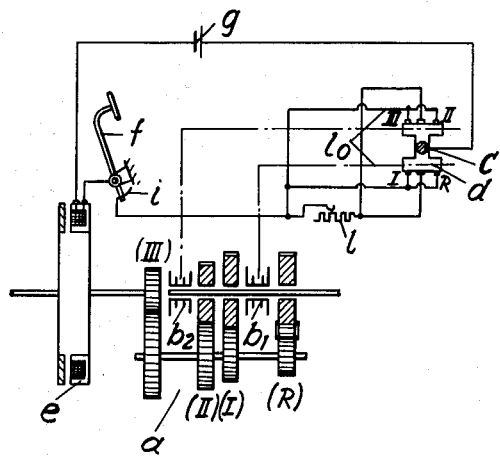
Figure 6:
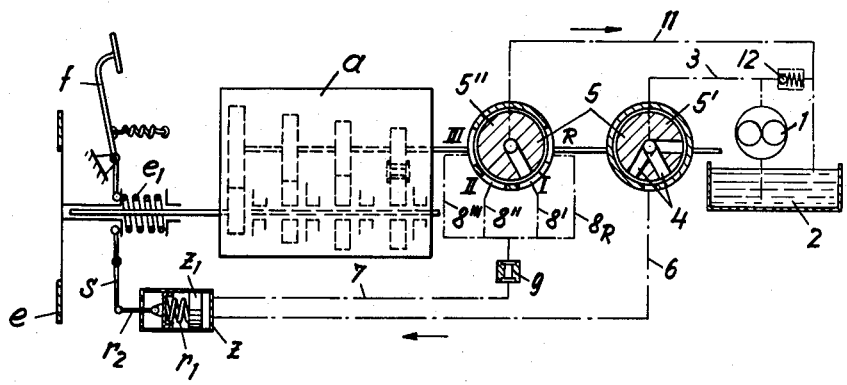

Figure 5 shows a modification of the variable drive ratio transmission similar to the one shown in Figure 1 in accordance with the present invention, and Figure 6 illustrates a still further embodiment of the variable drive ratio transmission similar to Figure 3 in accordance with the present invention.

The variable drive ratio transmission $a$ illustrated in Fig. 1 which includes 3 forward speeds (I), (II), (III) and 1 reverse (R) is shifted through two friction clutches $b_1$, $b_2$ which on their part are shifted by a gearshift lever $c$, by means of conventional rods as indicated, by dash and dot lines. The gearshift lever $c$ of which merely the cross-section is indicated is guided in the channel $d$. An electro-magnetic clutch $e$ is mounted between engine and transmission which as main disconnecting clutch may be operated by a clutch pedal $f$.

Gearshift $c$ and clutch $e$ are connected in series into an electric circuit with the power source $g$. The current is conducted to suitable contacts of the gearshift lever $c$ which depending on its position closes separate normally open contacts. When the gearshift lever is in one of the speeds (R), I, II, or III, then the current flows unimpaired through lines $l_0$ and $h$ to a contact rail $i$ which is developed as resistor and may be more or less switched into the electric circuit by the foot lever $f$ in such a manner that in the released position of the pedal the lowest resistance is interconnected in the circuit and when the foot pedal is depressed the greatest resistance is interconnected in the circuit or the circuit for the current may even be completely interrupted. From suitable contacts of the foot pedal $f$ the current flows through the exciting winding of the clutch $e$ and then it returns to the power source $g$ or to the ground. By depressing the foot pedal it is, therefore, possible in a conventional manner with an engaged speed to more or less attenuate the current flowing through the exciting winding and thereby diminish the transferable torque and disconnect the gear from the engine.

Between the contacts for the separate speeds are located further contacts each of which is assigned to a separate position of speed of the gearshift lever, for example, contacts $k_R$ and $k_I$ (Fig. 1a) which are assigned to the reverse and to the 1st speed respectively. Corresponding contacts are assigned to the 2nd and 3rd speeds. Likewise, each one of these contacts is connected with the contact rail $i$ of the foot pedal $f$ by means of line $h$, however, by way of resistors $l_R$, $l_I$, $l_{II}$, $l_{III}$ wherein $l_R$ has the highest resistance and $l_{III}$ the lowest resistance. When a sliding contact with one of these contacts is being established by the gearshift lever then the current in the circuit, together with the magnetic force in the exciting winding is being attenuated corresponding to the value of the particular resistance interposed at any given time, and in consequence thereof the clutch $e$ is partially disengaged, and that, to an extent corresponding to the value of the torque to be transmitted which is greater for the lower than the higher drive ratios or speeds.

Figure 1A:
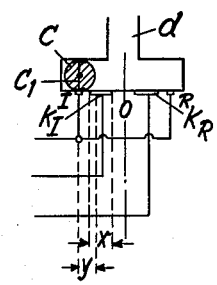
Fig. 1a is an enlarged section of a portion of Fig. 1.

The arrangement hereby is such that the current is entirely cut out when the gearshift lever is in neutral O (Fig. 1a). When the gearshift lever is being shifted out of its neutral position, as by way of example, into position I, shown in Fig. 1a of the drawing, corresponding to the 1st speed, then the gearshift lever with its contact surface $c_1$ passes, to begin with, the fixed contact surface $k_I$ and with which it closes a current path over a distance of travel $x$ whereby the clutch $e$ is disengaged or engaged an amount dependent on the current flow through coil $e$ which is determined by the value of resistance $l_1$. Even before the contact $c_1$ leaves the contact $k_I$, therefore even before the end of the travel $x$, the left hand friction surface of the shifting clutch $b_1$—for example, by the action of a spring—comes into engagement with the opposing surface of the gear for the 1st speed I of the variable drive ratio transmission, whereupon the gearshift lever may still be shifted into its terminal position I which, for example, may be made feelable by means of a notch on the corresponding shifting rod. The travel from the start of the engagement of the shifting clutch $b_1$ to the terminal of the gearshift lever is designated by $y$. As already mentioned and as apparent from Fig. 1a, the travels $x$ and $y$ overlap each other so that the 1st speed is already in gear when the main clutch is still partially disengaged. Furthermore, the contacts $k_1$, $c_1$ and at I (Fig. 1a) are suitably arranged relative to one another in such a manner that an interruption of the current does not take place when the contact $c_1$ passes from $k_I$ to I.

The shifting of the other speeds is accomplished in a corresponding manner.

Figure 2:
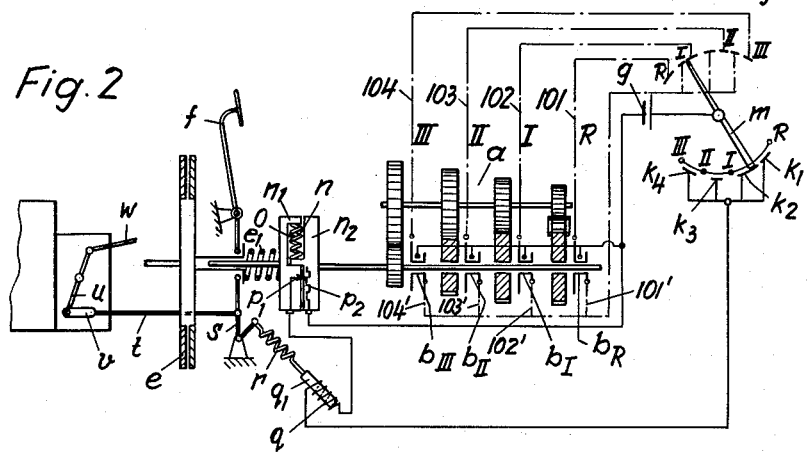
Fig. 2 is a gearshift diagram for an electrically shifted variable drive ratio transmission together with a mechanical main disconnecting clutch which is electrically operated and depends on the torque transmitted by it.

As is apparent from the modification of the present invention according to Fig. 2, each speed of the variable drive ratio transmission $a$ is shifted by means of separate individual shifting clutches ($b_R$ to $b_{III}$) which likewise may be developed as friction clutches and may be actuated in a convenient manner, for example, electrically. In electrical operation the current, supplied by the power source $g$, may be led, for example, by way of a switch $m$ and contacts R, I, II, or III to separate coils (not illustrated) over circuits schematically indicated in dot and dash lines 101, 102, 103, and 104 for actuating the shifting clutches, whereas for the return of the shifting clutches into their neutral positions separate electric circuits schematically illustrated in dot and dash lines 101', 102', 103', and 104' may be closed in the intermediate positions.

The drawing also shows the electrical circuit for automatically disengaging the main disconnecting clutch $e$ which in this case in connection with the clutch spring $e_1$ is indicated by a mechanical clutch depending upon the torque that is to be transmitted by the clutch. For this purpose a yieldable coupling $n$, responding to the torque, is interposed between main disconnecting clutch $e$ and transmission $a$. The coupling $n$ represented diagrammatically, consists, for example, of two clutch halves $n_1$ and $n_2$ of which the first clutch half $n_1$, which is connected with the engine, drives the other clutch half $n_2$, which is connected with the transmission $a$, in rotational direction by way of springs $o$, whereas in the opposite rotational direction they abut against each other by means of gibs or stops. Thereby the springs $o$ are suitably so proportioned that they just begin to yield at a certain torque and thereby allow only gradual adjustment up to maximum torque. With an increasing adjustment a contact $p_1$ on the clutch half $n_1$ slides upon contacts of the resistor $p_2$ of the other clutch half $n_2$ with the result that with increasing torque the resistance at $p_2$ is decreased, and consequently the current on hand in a given case in the electric circuit will be increased. The main clutch circuit will then be closed when the gearshift lever $m$ slides over the contacts $k_1$ to $k_4$ which are located between the contacts for the separate speeds. The electrical series circuit further includes a solenoid coil $q$ which when energizing a magnet $q_1$ puts a spring $r$ under tension which thereby tries to swing a lever $s$ clockwise and, depending on the excitation of the coil $q$, that is, depending on the current flowing through the circuit including switch $m$, one of contacts $k_1$ to $k_4$ and potentiometer $p_1$, $p_2$, whereby the actual setting of the potentiometer arm $p_1$ depends on the torque in the coupling $n$, more or less disengages the main clutch spring $e$ whereby, if occasion arises, the tension of the spring may also be reduced to zero.

To the lever $s$ or to $q_1$ is further connected, for example, a linkage $t$ which adjusts the lever for regulating the engine, for example, the volume regulator of a fuel injection pump, or a throttle valve of a carburetor, to partial load or no-load. As soon as the main disconnecting clutch is disengaged or the lever $s$ is swung by means of the coil $q$ the engine is adjusted to partial or no load. A play $v$ permits of setting the regulating lever $u$, independently of the disengaging of the clutch, to no-load or partial load by means of the linkage $w$.

The coupling $n$ of course may also be incorporated into the main disconnecting clutch $e$, or into the transmission $a$ and be made very small in size, so that it practically will not take up any essential space. It also may be arranged behind the transmission. Likewise—similar to the embodiment according to Fig. 1—the disengaging of the main disconnecting clutch $e$ or the excitation of the solenoid coil $q$ also may be accomplished depending on the position of the gearshift lever, in that each of the contacts $k_1$ to $k_4$ respectively, each contact assigned to the separate speeds, is connected with the solenoid coil $q$ by way of a resistor of increasing value. In that case the yieldable coupling $n$ may be omitted.

The embodiment of the invention according to Fig. 3 is mainly to be taken into consideration for hydraulically shifted gears, though it may likewise be employed for mechanically, electrically and pneumatically shifted gears. In the drawing there is merely represented diagrammatically the releasing of the clutch by hydraulic means. In this case the disengaging lever $s$ is actuated by compressed oil by means of a piston $z_1$ sliding in a cylinder $z$. This piston through a compression spring $r_1$ and linkage $r_2$ is effective upon the lever $s$.

The oil pressure, for example, is produced by a pump 1 which sucks the oil from a reservoir 2 and conveys it into a pipe line 3. From there the oil flows, for example, through a centrally located connection and radial bores 4 into the rotary slide valve 5 of which are shown in Fig. 3, for the sake of clearness, two cross-sections 5' and 5" side by side. The rotary slide valve suitably serves also as slide valve control for the hydraulic shifting of the separate speeds of a transmission, indicated schematically by $a$, as will be more fully described in connection with Figures 4 and 4a to 4d.

The bores 4 in the slide valve 5 work in conjunction with a pipe line 6 which leads to the cylinder $z$ whereby the bores 4 in that position of the slide valve 5 shown in the drawing—for example, in 1st speed—do not communicate with line 6.

A line 7 returns from the cylinder $z$. This line is divided into branch lines $8_R$, $8'$, $8''$, $8'''$ in such a manner that the outlet of the radial bore 10 in the cross-section 5" of the slide valve 5, in the position illustrated in the drawing, communicates with one of the outlets of the lines $8_R$ to $8'''$, for example, in 1st speed with I, which is assumed to be the speed of the very position shown in the drawing, in which it communicates with the outlet of line 8'. Furthermore, there are throttling places $9_R$ to $9'''$ provided in the lines $8_R$ to $8'''$. The throttling place $9_R$, for example, has the smallest passage, or if the occasion arises, the throttling place 9' may have the smallest passage whereas the throttling place 9''' has the largest passage.

Furthermore, the bore 10 in the slide valve 5 communicates in a suitable manner with the oil reservoir 2 through a return line 11. A reducing valve 12 may be arranged between the lines 3 and 11. This reducing valve opens when the line 3 is closed or the pressure in the same exceeds a permissable value. If occasion arises the slide valve 5, for example, in cross-section 5', may likewise control line 6 in such a manner that the latter, in the position illustrated, communicates with the return line 11 and thereby with reservoir 2.

The mode of operation of the arrangement according to Fig. 3 is as follows:

In the position of the slide valve 5 (illustrated in Fig. 3) the 1st speed of the gear is engaged. The pump 1 delivers the oil, since communication with line 6 is disconnected, through line 12, or likewise through a controlled connection of line 12 with return line 11, back into the reservoir 2. The cylinder $z$ is relieved through 7, 8', 10 and 11, or likewise, for example, through a controlled connection between line 6 and return line 11.

By way of example, a change over into second speed is supposed to take place; consequently bore 10 shifted from I to II and the shifting member 5 swung through a corresponding angle (in Fig. 3 about 60°) whereby the following takes place successively:

At, for example, ⅓ of the travel from I to II (Fig. 3a) line 6 through one of the bores 4 comes into communication with the pressure line 3. Accordingly the pump 1 delivers oil through 3, 4, and 6 into the cylinder $z$ from where through 7, 8', 10 and 11 it may flow back into 2. The throttle 9' in line 8' however, prevents a quick flowing off, so that the pressure in $z$ rises and pushes the piston $z_1$ toward the left. The spring $r_1$ is put under tension and correspondingly the spring $e_1$ relieved by way of the linkage $r_2$, $s$, consequently the main clutch $e$ is disengaged to a corresponding degree. Hereby the disengaging is essentially determined by the narrowness of the passage in the throttle 9'. The 1st speed, for example, likewise by hydraulic means, is thrown out in about the same position as shown on the left of Figure 3a.

As, for example, ⅔ of the travel from I to II (Fig. 3b), the bore 10 comes into the range of the outlet of the branch line 8''. Line 3 is still in communication with line 6. Although, due to the lower throttling in the throttling place 9'', the pressure in $z$ sinks correspondingly and the partial disengagement of the main clutch is lessened, being however, in other respects still maintained. In this position of the slide valve the second speed is thrown in. Hereby the reduced disengaging corresponds to the lower torque in the second speed. The disengaging, however, in each case is so chosen that the shifting clutch of the second speed engages the gear without jar or without substantial jar.

In the terminal position of the second speed (bore 10 in position II, Fig. 3c) lines 3 and 6 are again without communication with one another, so that the cylinder may relieve itself by way of line 7, throttle bore 9'', bore 10 and return line 11. For quicker relieving, the direct controlled connection (already mentioned) between lines 6 and 11, or such like, may likewise serve. Thereby a drop of pressure is produced in the cylinder $z$ by means of which the main clutch $e$ again is brought into full clutching engagement.

In shifting down from II to I the operations take place in an inverse sequence whereby prior to engaging the first speed the disengaging of the main clutch is intensified corresponding to the greater torque to be transmitted.

In the embodiment of Figure 4 the lower portion 15 of lever 5 of Figure 3 is shown in longitudinal cross section together with a transmission $a$ similar to that of Figure 2. The lower portion 15 of lever 5 is operative to direct pressure to and from the individual clutches $b_R$, $b_I$, $b_{II}$, and $b_{III}$ of the transmission $a$. The liquid used in the hydraulic system for actuating the individual clutches may be supplied from pump 1 of Figure 3 and reaches the lower portion 15 of lever 5 through inlet 13 connected with pressure line 3 of Figure 3. The liquid flows through a longitudinal bore 14, similar to the longitudinal bore shown in Figure 3, which is in communication with side bores 15, 16, 17, and 18 provided for the reverse, first, second, and third speeds or drive ratios of the transmission $a$. The side bores 15, 16, 17, and 18 are connected with corresponding clutches $b_R$, $b_I$, $b_{II}$, and $b_{III}$ by means of lines 19, 20, 21 and 22 respectively arranged above each other. The side bores 15, 16, 17, and 18 extend outwardly in such a manner and at such angles as to connect a corresponding line 19, 20, 21 and 22 with the longitudinal bore 14 in the positions of lever 5 corresponding to the position thereof in which the longitudinal bore of Figure 3 and radial bore 10 communicates with lines $8_R$, $8'$, $8''$, and $8'''$ respectively, so that the clutch corresponding to the engaged speed depending on the position of lever 5 of Figure 3 is actuated. In order to prevent accidental energization of those clutches $b_R$, $b_I$, $b_{II}$, and $b_{III}$ which are not engaged at the particular moment, those of the four lines 19, 20, 21, and 22 whose corresponding clutches are not engaged are connected to the discharge line 11 of Figure 3 in any conventional manner, as, for example, over helical grooves 23, 24, 25 and 26, longitudinal bore 27 and return line 28 which is connected to the line 11 of Figure 3.

In the simplest case, the partial disengagement of the main disconnecting clutch may also be accomplished uniformly during each shifting operation. This means that in the practical application of the embodiments illustrated and described hereinabove, the resistors $1_R$ to $1_{III}$ of Figure 1 and the throttling passages $9_R$ to $9'''$ of Figure 3 are respectively omitted and are replaced by a corresponding element having a constant characteristic, i. e., having a constant parameter or a constant throttling passage.

Figure 5 shows such a modification in which the four different resistors $1_R$ to $1_{III}$ are replaced by a single resistor 1. In all other respects, Figure 5 is identical with Figure 1.

Figure 6 illustrates a modification of Figure 3 in which the various throttling passages $9_R$ to $9''$ are replaced by a single throttling passage 9. In all other respects, Figure 6 is identical with Figure 3.

It will be obvious to those who are familiar with such matters that the details of construction may be varied from those shown by me and yet the essentials of the invention be retained. I therefore do not limit myself to such details.

What I claim is:

1. Apparatus for gear shift control of a variable drive ratio transmission comprising input means, a main clutch connected between said input means and said transmission, manual shifting means for said variable drive ratio transmission, means operatively connected with said shifting means for operating said clutch in response to operation of said shifting means, said last mentioned means including control means for only partially disengaging said clutch throughout operation of said shifting means from one ratio to another to provide slip in said clutch and transmission of continued power of predetermnied amount from said input means to said transmission throughout the shifting operation.

2. The apparatus according to claim 1 wherein said control means includes means for varying the amount of disengagement of said clutch in proportion to the amount of torque to be transmitted by said clutch under predetermined conditions.

3. The apparatus according to claim 1 wherein said control means includes further means responsive to the torque required to be transmitted by said clutch to proportionately vary the amount of disengagement thereof.

4. A gear shift control for a variable drive ratio transmission the combination of input means, a main disconnecting clutch between said input means and said transmission adapted to partially disconnect said transmission from said input means, spring means for engaging said main clutch, and means for partially disengaging said main clutch against the force of said spring means during substantially the entire shifting operation from one ratio to another to provide slippage in said main clutch and therewith continuous transmission of torque therethrough during the shifting operation, said last named means including connecting means between said gear shifting control and said last named means whereby the disengaging is rendered operative during shifting from one ratio to another.

5. The apparatus according to claim 4 wherein the relieving means comprises a further spring means which counteracts said first named spring means whereby said further spring means with increasing tension effects an increase in the disengaging of said main clutch from the spring tension of said first mentioned spring means.

6. The apparatus according to claim 1 further comprising means for influencing the power of said input means depending on the actuation of said control means in such manner that the power of said input means is decreased with increased disengagement of said clutch.

7. A device for gear shift control of a variable drive ratio transmission including input means, a main clutch connected between said input means and said transmission and adapted to partially disconnect said input means from said transmission, a gear shift member for shifting said transmission, an electrical means operatively connected to said gearshift member and to said clutch for effecting engagement and disengagement of said clutch during operation of said gear shift member to change the drive ratio, said electrical means comprising a plurality of spaced contact members, an electrical circuit in series with said contact members and energizing means connected to said electrical circuit whereby a circuit is closed by operation of said gear shift control to energize said last named means, said contact members having intermediate positions and a plurality of varying resistors connected between said intermediate positions and said electrical circuit, whereby maximum current is permitted to flow in all but said intermediate positions of said contact members.

8. In combination with a gear shift control for a variable drive ratio transmission, an input means, a main clutch between said input means and said transmission, a gear shift member for effecting the various ratios of said transmission, said member including at least two contacts for the position of each ratio corresponding to an intermediate position and to an end position, a series circuit including a power supply and energizing means for said clutch, said series circuit being connected directly with the end position, and a plurality of resistors of varying values connected between said series circuit and said intermediate positions, said intermediate positions overlapping with the positions corresponding to the various ratios, whereby the clutch is only partially disengaged during operation of said member from one drive ratio to another.

9. A device for a gear shift control for a variable drive ratio transmission comprising input means, a main disconnecting clutch intermediate said input means and said transmission for partially disconnecting said input means from said transmission, hydraulic piston means for partially disengaging said clutch, means for changing the drive ratio of said transmission, further means for controlling the force of said hydraulic piston means in response to operation of said last named means, and a return means between said piston means and said further means.

10. The device according to claim 9 including varying throttling means in said return means for varying the pressure in said return means.

11. A device including a control member for shifting a variable drive ratio transmission comprising input means, a main disconnecting clutch between said input means and said transmission for partially disrupting power transmission therebetween, a plurality of notches in said control member corresponding to different drive ratios of said transmission, means for shifting said control member from one notch to another, means for only partially releasing said clutch throughout operation of said control member from one notch to another to provide slippage in said clutch and therewith continue reduced transmission of power throughout said operation, said last named means being operative to disengage said clutch only partially during change over from one ratio to another when said control member is moved from one notch into another.

12. The device according to claim 11 wherein said last-named means further comprises resistance means for changing the amount of disengagement of said main clutch.

13. A device with a variable speed transmission for changing the ratio of transmission therethrough comprising input means, a main disconnecting clutch between said input means and said transmission for partially disrupting transmission of power from said input means to said transmission, said clutch including a spring normally rendering said clutch operative to transmit power, means for opposing the force exerted by said spring, a device for shifting the ratio of said transmission, means operatively connected with said shifting device for only partially disengaging said clutch, said last named means being operative between two positions corresponding to two ratios of said transmission and rendered inoperative with the shifting device and a position corresponding to one of said ratios.

14. A device including a control member for changing the ratios of a variable drive ratio transmission comprising input means, a main disconnecting clutch between said input means and said transmission adapted to partially disrupt transmission of power by said clutch, said clutch including friction means and a spring means normally rendering said friction means operative to transmit power therethrough, auxiliary means connected in said clutch in opposition to said spring means, and means operatively connected to said control member for actuating said auxiliary means to partially disengage said clutch, said actuating means including a hydraulic system operative to effect only partial disengagement of said clutch during shifting of said control member from one ratio to another.

15. A control apparatus including a control member for varying the ratio of a variable drive ratio transmission comprising input means, a main clutch between said input means and said transmission, hydraulic means operatively connected with said control member for only partially disengaging said main clutch, said hydraulic means including a piston, throttling means connected to said piston, a source of fluid for said hydraulic means, and means interconnecting said throttling means with said source and interconnecting said piston with said source.

16. The apparatus according to claim 15 wherein the interconnecting means includes valve means having a plurality of aligned bores of varying diameter corresponding to the position of said control member in the various ratios of said transmission, and further means in said valve means for varying the effectiveness of said throttling means.

17. A device including control means for shifting the ratio of a variable drive ratio transmission comprising input means, a main disconnecting, spring-biased, friction clutch means interconnected between said input means and said transmission for interrupting the drive therebetween, hydraulic auxiliary power means operatively connected to said control means including a piston means, connecting means between said piston means and said clutch means for partially disengaging said clutch, and means in said hydraulic auxiliary means for only partially disengaging said clutch means during the shifting of said transmission from one ratio to another.

18. A device for changing the ratio of a variable drive ratio transmission including input means, clutch means intermediate said input means and said transmission, means for changing the ratio of said transmission including hydraulic means operatively connected with said changing means for only partially disengaging said clutch means during the change of said transmission from one ratio to another to provide slippage in said clutch means and continue transmission of power therethrough at predetermined lesser rate.

19. In combination with a variable drive ratio transmission, input means, clutch means intermediate said input means and said transmission, means for changing the ratio of said transmission, said last named means comprising control means operated by said changing means for only partially disengaging said clutch means throughout the changing of ratios to provide slippage in said clutch means and continue transmission of torque therethrough at a reduced rate.

20. The apparatus according to claim 19 wherein said control means includes a plurality of individual control circuit means to vary the amount of partial disengagement of said clutch means during the changing of said transmission from a particular ratio to another ratio.

21. The apparatus according to claim 20 wherein said control means comprises a hydraulic system including valve means operative to throttle the pressure in said hydraulic system.

22. A device for shifting change speed gears of a power transmitting device comprising, means including a main disconnecting clutch for at least partially interrupting the transmission of power by said power transmitting device, said main disconnecting clutch being formed as a friction clutch and including spring means for engaging said friction clutch, a clutching member connected with said main disengaging clutch for arbitrarily operating said main disconnecting clutch, a gear shift member connected with said change speed gears for changing the transmission ratio thereof, means operatively connected with said gear shift member for relieving said main disconnecting clutch partially in an intermediate position of said gear shift member to provide slippage in said main disconnecting clutch and therewith provide continuous transmission of power therethrough with said gear shift member in said intermediate position, said clutching member and said relieving means being operative independently of one another for partially disengaging said main disconnecting clutch.

23. A device for shifting speed gears of a power transmitting device comprising, means including a main disconnecting clutch for at least partially interrupting the transmission of power by said power transmitting device, said main disconnecting clutch being formed as a friction clutch and including spring means for engaging said friction clutch, a gear shift member connected with said change speed gears for changing the speeds thereof, electric means for varying the torque transmitted by said main disconnecting clutch including electric circuits having control members, and means inluding said gear shift member for closing said circuits to provide maximum transmission of torque by said main disconnecting clutch with said gear shift member in positions corresponding to the various speeds of said speed gears and to provide a reduced transmission of torque with said gear shift member in an intermediate position.

24. A device according to claim 23, wherein the current in said circuits is interrupted with said gear shift member in neutral position to interrupt the transmission of torque.

25. A device according to claim 23 further including resistors of different values connected to said contact members in at least some of said circuits operative to provide larger partial disengagement of said main disconnecting clutch in the lower speeds than in the higher speeds.

26. A device according to claim 23, further comprising means for varying the current in said circuits in response to the torque transmitted by said main disconnecting clutch.

References Cited in the file of this patent

UNITED STATES PATENTS

| 1,805,120 | Von Erhardt | May 12, 1931 |
|---|---|---|
| 1,883,743 | Maybach | Oct. 18, 1932 |
| 2,072,832 | Weydell | Mar. 2, 1937 |
| 2,073,692 | Griswold | Mar. 16, 1937 |
| 2,074,476 | Kolb | Mar. 23, 1937 |
| 2,075,579 | Hansen | Mar. 30, 1937 |
| 2,084,380 | Bragg et al. | June 22, 1937 |
| 2,104,061 | Surdy | Jan. 4, 1938 |
| 2,153,509 | Rockwell | Apr. 4, 1939 |
| 2,230,133 | Clarke | Jan. 28, 1941 |
| 2,263,047 | Newton | Nov. 18, 1941 |
| 2,307,676 | Harlan | Jan. 5, 1943 |
| 2,328,090 | Nutt | Aug. 31, 1943 |
| 2,360,496 | Hill | Oct. 17, 1944 |

FOREIGN PATENTS

| 65,498 | Sweden | Sept. 22, 1924 |
|---|---|---|
| 516,730 | Great Britain | Jan. 10, 1940 |
| 610,595 | Great Britain | Oct. 18, 1948 |
| 764,596 | France | May 24, 1934 |
| 863,081 | France | Mar. 22, 1941 |